(12) United States Patent
Kawaguchi et al.

(10) Patent No.: US 9,876,250 B2
(45) Date of Patent: Jan. 23, 2018

(54) CELL STACK DEVICE, MODULE, AND MODULE HOUSING DEVICE

(71) Applicant: KYOCERA Corporation, Kyoto-shi, Kyoto (JP)

(72) Inventors: Masaya Kawaguchi, Kirishima (JP); Kyosuke Yamauchi, Kirishima (JP)

(73) Assignee: KYOCERA Corporation, Kyoto-shi, Kyoto (JP)

( * ) Notice: Subject to any disclaimer, the term of this patent is extended or adjusted under 35 U.S.C. 154(b) by 0 days.

(21) Appl. No.: 15/305,170

(22) PCT Filed: Apr. 20, 2015

(86) PCT No.: PCT/JP2015/061972
§ 371 (c)(1),
(2) Date: Oct. 19, 2016

(87) PCT Pub. No.: WO2015/163277
PCT Pub. Date: Oct. 29, 2015

(65) Prior Publication Data
US 2017/0040633 A1   Feb. 9, 2017

(30) Foreign Application Priority Data

Apr. 21, 2014 (JP) .................................. 2014-087415

(51) Int. Cl.
*H01M 2/20* (2006.01)
*H01M 8/2485* (2016.01)
(Continued)

(52) U.S. Cl.
CPC ............. *H01M 8/2485* (2013.01); *C25B 9/00* (2013.01); *C25B 9/18* (2013.01); *H01M 8/24* (2013.01); *H01M 8/0276* (2013.01); *H01M 8/12* (2013.01)

(58) Field of Classification Search
CPC .. C25B 9/00; C25B 9/18; H01M 8/12; H01M 8/24; H01M 8/2485
See application file for complete search history.

(56) References Cited

FOREIGN PATENT DOCUMENTS

| JP | 2005-158531 | * | 6/2005 | ............... H01M 8/24 |
|----|-------------|---|--------|--------------------------|
| JP | 2005-158531 | A | 6/2005 | |
| JP | 2007-059377 | A | 3/2007 | |

OTHER PUBLICATIONS

International Search Report (Form PCT/ISA/210) dated Jul. 21, 2015, issued for PCT/JP2015/081972.

(Continued)

*Primary Examiner* — Ula C Ruddock
*Assistant Examiner* — Ben Lewis
(74) *Attorney, Agent, or Firm* — Viering, Jentschura & Partner mbB

(57) ABSTRACT

In at least one sealing member (16) disposed between at least two neighboring cells of a plurality of cells (3) in this cell stack device, the angle θ is 45° or less, where the angle θ is defined by an angle between a vertical line drawn from a leading end portion (18) of a meniscus structure toward a manifold (7) and a straight line connecting the leading end part (18) and a point (19) located on a profile line of a concave of the meniscus structure, and at a midpoint of a height of the leading end part (18) from the bottom part (17) of the concave, which makes it possible to obtain a cell stack device in which the occurrence of cracking at bonded parts between the fuel cells (3) and the sealing member (16) is suppressed and reliability is improved.

7 Claims, 7 Drawing Sheets

(51) Int. Cl.
*C25B 9/00* (2006.01)
*C25B 9/18* (2006.01)
*H01M 8/24* (2016.01)
*H01M 8/0276* (2016.01)
*H01M 8/12* (2016.01)

(56) References Cited

OTHER PUBLICATIONS

Written Opinion (Form PCT/ISA/237) dated Jul. 21, 2015, issued for PCT/JP2015/061972.

* cited by examiner

CELL STACK DEVICE, MODULE, AND MODULE HOUSING DEVICE

TECHNICAL FIELD

The present invention relates to a cell stack device, a module, and a module housing device.

BACKGROUND ART

In recent years, cell stack devices in which a plurality of fuel cells, which are cells that generate electrical power using a fuel gas (hydrogen-containing gas) and an oxygen-containing gas (air), are connected together have been proposed as next-generation energy sources. Meanwhile, various types of fuel cell modules in which a cell stack device is housed in a housing container, as well as various types of fuel cell devices in which such a fuel cell module is housed in an external casing, have also been proposed (see Patent Literature 1, for example).

A configuration in which one end of a fuel cell is affixed to a manifold with a sealing member and the sealing member has a concave meniscus structure has been proposed as an example of such a cell stack device (see Patent Literature 2, for example).

CITATION LIST

Patent Literature

Patent Literature 1: Japanese Unexamined Patent Application Publication No. 2007-59377A
Patent Literature 2: Japanese Unexamined Patent Application Publication No. 2005-158531A

SUMMARY OF INVENTION

Technical Problem

In cell stack devices such as those described above, there has been a problem in that depending on the form of bonding between the sealing member and the fuel cell, deformation accompanying reduction of the fuel cell and the like produces cracks in the above-described bonded parts between the sealing member and the fuel cell. This in turn produces cracks in the fuel cell.

In light of this, an object of the present invention is to provide a cell stack device, a module, and a module housing device having improved reliability.

Solution to Problem

A cell stack device according to the present invention includes a cell stack including a plurality of cells that are arranged and a manifold fixed to an end of each of the cells. The cells and the manifold are fixed to each other with sealing member, and each of the sealing member has a meniscus structure having a concave shape in a cross-section taken in a direction in which the cells are arranged. An angle θ of at least a section of the sealing member disposed between at least two neighboring cells of the cells is 45° or less, where the angle θ is defined by an angle between a vertical line drawn from a leading end portion of the meniscus structure toward the manifold and a straight line connecting the leading end portion and a point located on a profile line of a concave of the meniscus structure and at a midpoint of a height of the leading end portion from a bottom part of the concave.

A module according to the present invention includes a housing, and the cell stack device configured as described above in the housing.

Furthermore, a module housing device according to the present invention includes an external casing, the module configured as described above in the external casing, and an auxiliary device configured to operate the module in the external casing.

Advantageous Effects of Invention

A cell stack device according to the present invention can provide a cell stack device having improved reliability.
Additionally, a module according to the present invention can provide a module having improved reliability.
Furthermore, a module housing device according to the present invention can provide a module housing device having improved reliability.

BRIEF DESCRIPTION OF DRAWINGS

FIG. 1A is a side view schematically illustrating the cell stack device and FIG. 1B is a horizontal cross-sectional view illustrating part of FIG. 1A in an enlarged manner.

DESCRIPTION OF EMBODIMENTS

Figure 1A:
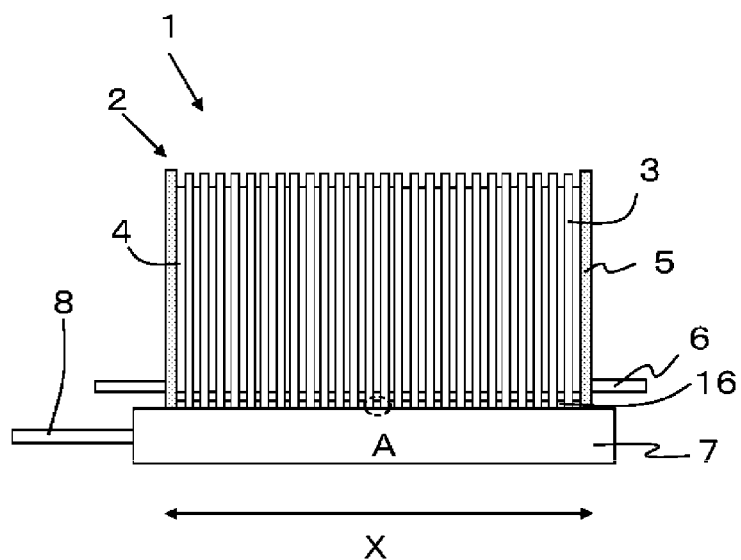
FIGS. 1A and 1B illustrate a cell stack device according to the present embodiment, where
Figure 1B:
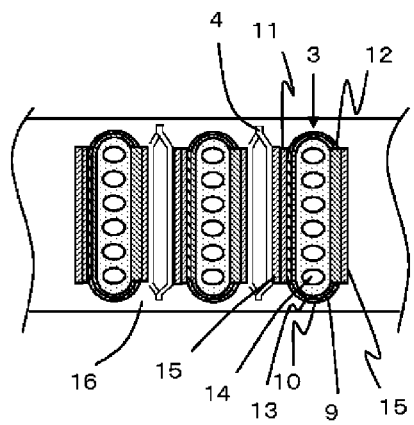

A cell stack device according to the present embodiment will be described hereinafter using the drawings. FIGS. 1A and 1B illustrate the cell stack device according to the present embodiment, where FIG. 1A is a side view schematically illustrating the cell stack device and FIG. 1B is a side cross-sectional view illustrating part of FIG. 1A in an enlarged manner. Note that in the subsequent drawings, identical constituent elements are indicated using the same reference numerals.

Note that the cell stack device illustrated in FIGS. 1A and 1B (referred to as a "cell stack device" hereinafter) is a fuel cell stack device including a plurality of fuel cells that are a type of cell and are arranged. The following will describe the fuel cell as the cell.

A cell stack device 1 illustrated in FIGS. 1A and 1B includes a cell stack 2 including a plurality of columnar fuel cells 3. Each fuel cell 3 includes gas-flow passages 14 in its interior, and is formed by layering a fuel electrode layer 9, serving as an inner electrode layer, a solid electrolyte layer 10, and an air electrode layer 11, serving as an outer electrode layer, in that order on one flat face of an overall columnar electrically conductive support body 13 that has a flat cross-section having a pair of opposing flat faces, and layering an interconnector 12 to a part of the other flat face where the air electrode layer 11 is not formed. The fuel cells 3 are electrically connected to each other in series by interposing electrically conductive members 4 between adjacent fuel cells 3. Note that an electrically conductive bonding member 15 is disposed on an outer surface of the interconnector 12 and an outer surface of the air electrode layer 11. By connecting the electrically conductive member 4 to the air electrode layer 11 and the interconnector 12 using the bonding member 15, the contact between those elements becomes ohmic contact, reducing a drop in potential and effectively suppressing a drop in electrical conductivity performance.

A lower end of each fuel cell 3 that constitutes the cell stack 2 is fixed, with a sealing member 16 such as glass, to a manifold 7 for allowing a reactive gas to be supplied to the fuel cell 3 via the gas-flow passages 14. The sealing member 16 will be described later. Meanwhile, the cell stack device 1 illustrated in FIGS. 1A and 1B is illustrated as an example in which the manifold 7 allows hydrogen-containing gas (a fuel gas) to be supplied to the gas-flow passages 14 as the reactive gas, and a fuel gas supply pipe 8 for allowing the fuel gas to be supplied to the manifold 7 is connected to a side surface of the manifold 7.

Additionally, an elastically deformable electrically conductive member 5 whose lower end is fixed to the manifold 7 is provided sandwiching the cell stack 2 from both ends in a direction (the X direction in FIG. 1A) in which the fuel cells 3 are arranged, with the electrically conductive members 4 interposed between the electrically conductive member 5 and the fuel cells 3. Here, in the electrically conductive member 5 illustrated in FIG. 1A, a current extracting member 6 is provided for extracting electrical current generated by the power generation of the cell stack 2 (the fuel cells 3) with a shape extending outward in the direction in which the fuel cells 3 are arranged.

Incidentally, the above-described cell stack device 1 can have a configuration in which fuel gas exhausted from the gas-flow passages 14 (excess fuel gas) is burned on an upper end portion side of the fuel cells 3 so as to raise the temperature of the fuel cells 3. This configuration makes it possible to accelerate the startup of the cell stack device 1.

Each member constituting the fuel cell 3 illustrated in FIGS. 1A and 1B will be described next.

A well-known conventional material can be used for the fuel electrode layer 9. For example, the fuel electrode layer 9 can be formed of $ZrO_2$ (referred to as a stabilized zirconia that also includes partially stabilized zirconia) containing a porous electrically conductive ceramic such as a rare earth element oxide in solid solution and Ni and/or NiO.

The solid electrolyte layer 10 must function as an electrolyte that allows electrons to move between the electrodes and have a gas blocking property that prevents fuel gas and oxygen-containing gas leaks. The solid electrolyte layer 10 is formed of $ZrO_2$ containing from 3 to 15 mol % of a rare earth element oxide in solid solution. Note that the solid electrolyte layer 10 may be formed of another material as long as that material exhibits the abovementioned properties.

The material for the air electrode layer 11 is not particularly limited, and any well-known conventional material may be used. For example, the air electrode layer 11 may be formed of an electrically conductive ceramic made from a so-called $ABO_3$ perovskite oxide. The air electrode layer 11 must be gas-permeable, and the open porosity of the air electrode layer 11 is preferably 20% or greater and particularly in the range of 30 to 50%.

The interconnector 12 can be formed from electrically conductive ceramics, but because the interconnector 12 makes contact with the fuel gas (hydrogen-containing gas) and oxygen-containing gas (air or the like), the interconnector 12 must be reduction resistant and oxidation resistant. As such, a lanthanum chromite perovskite oxide ($LaCrO_3$ oxide) is suitable for use as the interconnector 12. The interconnector 12 must be dense in order to prevent leaks of the fuel gas flowing through the plurality of gas-flow passages 14 formed in the electrically conductive support body 13 as well as leaks of the oxygen-containing gas flowing outside the electrically conductive support body 13. Thus, the interconnector 12 preferably has a relative density of 93% or greater and particularly 95% or greater.

The electrically conductive support body 13 must be gas-permeable to allow the fuel gas to permeate through to the fuel electrode layer 9 and must also be electrically conductive in order to allow current collection via the interconnector 12. Therefore, it is necessary to employ a material that satisfies these requirements, and as such, a material such as an electrically conductive ceramic or cermet can be used for the electrically conductive support body 13. For production of the fuel cells 3, if the electrically conductive support body 13 is produced by simultaneous firing with the fuel electrode layer 9 or the solid electrolyte layer 10, the electrically conductive support body 13 is preferably formed of an iron group metal component and a specific rare earth oxide ($Y_2O_3$, $Yb_2O_3$, or the like). Additionally, to ensure a desired gas permeability, the electrically conductive support body 13 preferably has an open porosity of 30% or greater and particularly in the range of 35 to 50%. The electrically conductive support body 13 also preferably has an electrical conductivity of 300 S/cm or greater and particularly 440 S/cm or greater.

Although not illustrated in the drawings, an intermediate layer may be formed between the solid electrolyte layer 10 and the air electrode layer 11 with the aim of strengthening the bond between the solid electrolyte layer 10 and the air electrode layer 11 and suppressing the formation of a reactive layer with high electric resistance due to a reaction between the components of the solid electrolyte layer 10 and the components of the air electrode layer 11.

The intermediate layer can be formed by a composition that contains Cerium (Ce) and another rare earth element. The intermediate layer preferably has a composition expressed by, for example, $$(CeO_2)_{1-x}(REO_{1.5})_x, \qquad (1):$$

where RE represents at least one of Sm, Y, Yb, and Gd, and x represents a number satisfying $0 < x \leq 0.3$. Furthermore, in order to reduce the electric resistance, Sm or Gd is preferably used as RE. For example, the intermediate layer is preferably formed of a $CeO_2$ solid solution containing from 10 to 20 mol % of $SmO_{1.5}$ or $GdO_{1.5}$.

Additionally, the intermediate layer can be formed of two layers in order to strongly bond the solid electrolyte layer 10 with the air electrode layer 11 and further suppress the formation of a reaction layer having a high electric resistance due to a reaction between components of the solid electrolyte layer 10 and components of the air electrode layer 11.

Additionally, although not illustrated, a cohesion layer for reducing, for example, a difference in thermal expansion coefficients between the interconnector 12 and the electrically conductive support body 13 may also be provided between the interconnector 12 and the electrically conductive support body 13.

A composition similar to that of the fuel electrode layer 9 can be used as the cohesion layer. For example, the cohesion layer can be formed of $ZrO_2$ (called stabilized zirconia) containing a rare earth element oxide such as YSZ in solid solution and Ni and/or NiO. Note that the $ZrO_2$ containing the rare earth element oxide in a solid solution and the Ni and/or NiO are preferably set to a volume ratio in a range of 40:60 to 60:40.

Incidentally, in the cell stack device 1 illustrated in FIGS. 1A and 1B, one end of each fuel cell 3 is fixed to the manifold 7 with the sealing member 16. However, there has been a problem in that depending on the shape of the sealing member 16, deformation accompanying reduction of the fuel cell 3 and the like produces cracks in the bonded part between the sealing member 16 and the fuel cell 3. Here, it was discovered making the shape of the sealing member 16 a predetermined shape makes it possible to suppress the formation of cracks and achieve a cell stack device 1 having improved reliability.

Figure 2:
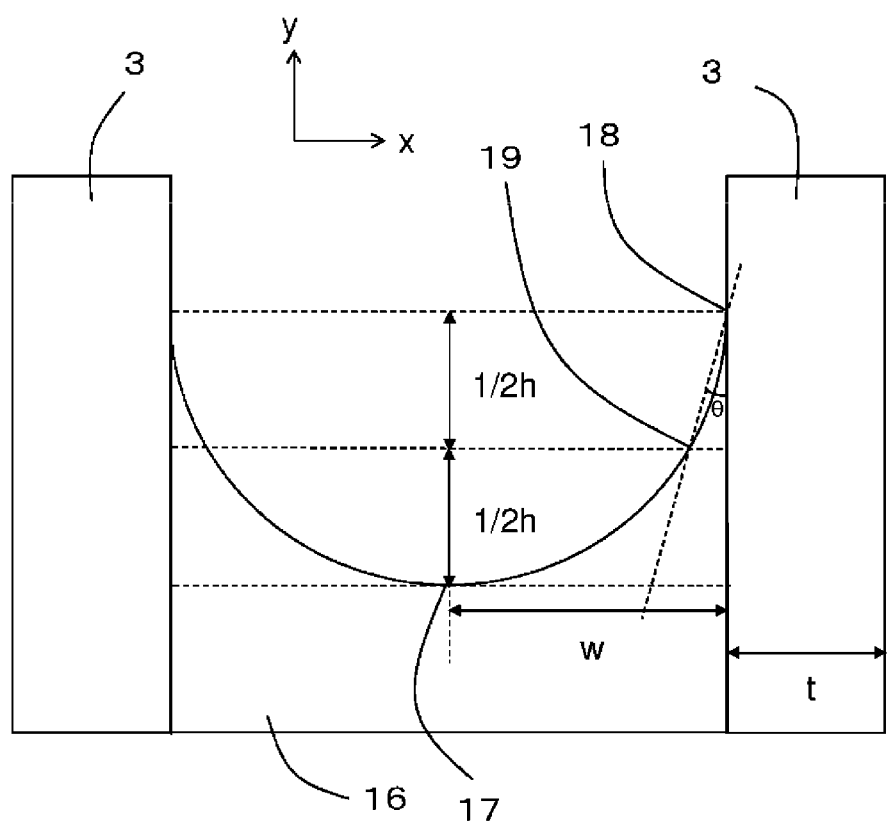
FIG. 2 is a cross-sectional view illustrating a part of the cell stack device indicated by a dotted line A in FIG. 1A in an enlarged manner.

FIG. 2 is a cross-sectional view illustrating a part indicated by a dotted line A in FIG. 1A in an enlarged manner. Note that the configuration of the manifold 7 is not illustrated in FIG. 2.

The sealing member 16 in FIG. 2 has a concave meniscus structure. In other words, the sealing member 16 has a concave profile line, has a bottom part 17 near a center portion located between the fuel cells 3, and is provided so as to rise upward as the sealing material 16 progresses from the bottom part 17 toward the fuel cells 3.

Here, there are cases where contracting deformation arises during reduction of the fuel cell 3. In this case, as the sealing member 16 inhibits the contraction, stress oriented toward the sealing member 16 side arises in the fuel cell 3. On the other hand, as the sealing member 16 is pulled by the contraction of the fuel cell 3, stress oriented toward the fuel cell 3 sides arises in the sealing member 16.

As a result of diligent research by the inventors, it was discovered that reducing this stress difference or turning the stress into compressive stress at a bonded part between the vicinity of a leading end portion of the sealing member 16 and the fuel cell 3 makes it possible to suppress the formation of cracks in the bonded part.

It was also discovered that an angle $\theta$ between a vertical line drawn from a leading end portion 18 of the meniscus of the sealing member 16 toward the manifold 7 and a straight line connecting the leading end portion 18 and a point 19 located on the concave profile line of the meniscus and at a midpoint of the height of the leading end portion 18 from the bottom part 17 of the concave, or in other words, the shape of the ascending part of the sealing member 16, greatly affects the stress at the bonded part between the fuel cell 3 and the sealing member 16.

As such, in the sealing member 16 illustrated in FIG. 2, the angle $\theta$ between the vertical line drawn from the leading end portion 18 of the meniscus of the sealing member 16 toward the manifold 7 (to the lower side in FIG. 2) and the straight line connecting the leading end portion 18 and the point 19 located on the concave profile line of the meniscus and at a midpoint of the height of the leading end portion 18 from the bottom part 17 of the concave (indicated by a broken line in FIG. 2) is set to 45° or less.

This makes it possible to reduce a difference between the stresses arising in the fuel cell 3 and the sealing member 16 at the bonded part and turn this stress into compressive stress, which makes it possible to suppress the formation of cracks. Note that a shape in which the angle $\theta$ is 30° or less is preferable in terms of suppressing the formation of cracks even more.

In the case where a distance between the bottom part 17 of the concave of the sealing member 16 and the fuel cell 3 is represented by w, an area where the length of a vertical line drawn from the profile line of the concave to the fuel cell 3 is 2% of w may be taken as the leading end portion 18 of the sealing member 16. The angle $\theta$ may then be found by drawing the straight line or vertical line using an intersection point between the leading end portion 18 and the fuel cell 3 as a starting point.

An electrically insulating material having a thermal resistance of 800 to 1,000° C. is preferable as the sealing member 16. For example, glass (and particularly non-crystalline glass or glass containing a crystal substance), cement, or the like can be used.

Here, when the above-described meniscus structure is to be used as the structure of the sealing member 16 between the fuel cells 3, at least the sealing member 16 between the fuel cells 3 where it is likely that cracks will form preferably has the above-described structure. For example, in the cell stack device 1, there may be cases where strong stress is produced by deformation or the like in the fuel cells 3 disposed in an end section in the direction in which the fuel cells 3 are arranged. In this case, it is likely that cracks will form in the fuel cells 3 disposed in the end section in the direction in which the fuel cells 3 are arranged. In light of this, the above-described meniscus structure can be employed as the structure of the sealing member 16 between two neighboring cells of the fuel cells 3 disposed in the end section in the direction in which the fuel cells 3 are arranged. Preferably, the cell stack device 1 is examined in advance for places between fuel cells 3 where cracks are likely to form, and the above-described structure is employed for the sealing member 16 between the fuel cells 3 where cracks are likely to form.

Furthermore, from the standpoint of strengthening the bonds between all of the fuel cells 3 and the sealing members 16 and improving the reliability, the above-described meniscus structure can be employed for the sealing members 16 disposed between any two neighboring cells of the fuel cells 3.

In this case, the stress will differ from fuel cell 3 to fuel cell 3 and from sealing member 16 to sealing member 16, and thus the angle $\theta$ of the sealing member 16 in areas where the stress is particularly strong can be set to be lower than the angle $\theta$ of the sealing member 16 in other areas. This configuration makes it possible to improve the reliability of the cell stack device 1 as a whole. For example, the angle $\theta$ of the sealing member 16 in the end section in the direction in which the fuel cells 3 are arranged may be set to be lower than the angle $\theta$ of the sealing member 16 in the center section in the direction in which the fuel cells 3 are arranged.

Here, if the height of the sealing member 16 is low relative to a thickness t of the fuel cells 3, the leading end portion of the sealing member will have a lower volume, which makes it difficult for the sealing member 16 to sufficiently suppress deformation caused by reduction or the like in the fuel cells 3. In light of this, when, for example, h represents a height from the bottom part 17 of the concave of each of the sealing members 16 to the leading end portion and t represents a thickness of each of the fuel cells 3, an equation of h≥t/3 can be satisfied. The h may be set so that h≥t/2 is satisfied to more effectively suppress deformation.

This makes it possible for the sealing member 16 to suppress deformation in the fuel cells 3, which in turn makes it possible to realize a cell stack device 1 having improved reliability.

With respect to an upper limit value for the height of the sealing member 16 (the height of the leading end portion), the height can, in consideration of the power generation efficiency of the fuel cells 3, be set to a height at which there is no contact with the air electrode layers 11 of the fuel cells 3, the electrically conductive members 4, and the like.

Meanwhile, as illustrated in FIGS. 1A and 1B, there are cases, in a fuel cell 3 whose cross-section has a flat shape, where deformation accompanying reduction or the like in the fuel cell 3 is greater in a width direction that is a direction perpendicular to the direction in which the fuel cells are arranged (the vertical direction in FIG. 1B; called simply a "width direction" hereinafter) than in the thickness direction t of the fuel cell 3. Thus when the bonded part between the fuel cell 3 and the sealing member 16 is viewed in the width direction of the fuel cell 3, there are cases where cracks are likely to form in the end section in the width direction of the fuel cell 3.

Accordingly, the angle θ of the bonded part between the fuel cell 3 and the sealing member 16 in the end section in the width direction of the fuel cell 3 can be set to be lower than the angle θ of the bonded part between the fuel cell 3 and the sealing member 16 in the center section in the width direction of the fuel cell 3. This makes it possible to more efficiently suppress the formation of cracks, which in turn makes it possible to provide a cell stack device 1 having improved reliability.

Figure 3:
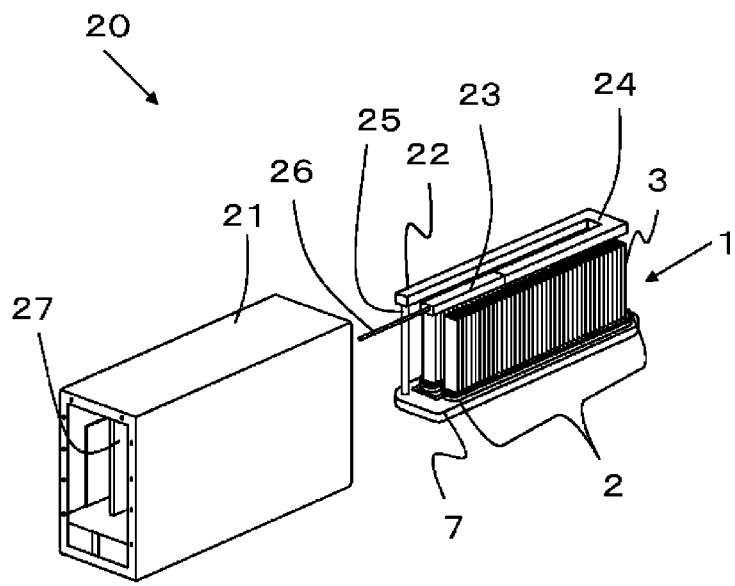
FIG. 3 is a perspective view illustrating an example of a module according to the present embodiment.
Figure 4:
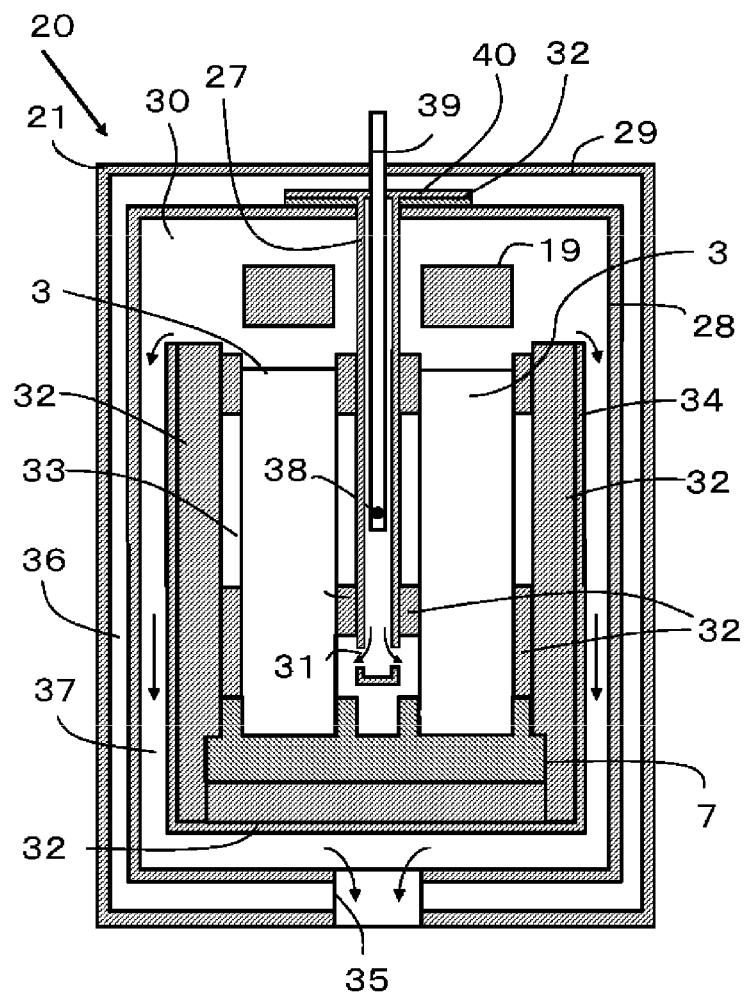
FIG. 4 is a cross-sectional view of the module illustrated in FIG. 3.

FIG. 3 is an exterior perspective view illustrating an example of a fuel cell module (also referred to as a "module" hereinafter) including the cell stack device 1 according to the present embodiment, and FIG. 4 is a cross-sectional view of FIG. 3.

In a module 20 illustrated in FIG. 3, the cell stack device 1 according to the present embodiment is housed within a housing container 21. A reformer 22 configured to generate fuel gas to be supplied to the fuel cells 3 is arranged above the cell stack device 1. Note that FIG. 3 illustrates an example in which the cell stack device 1 includes two cell stacks 2. However, the number of cell stacks may be changed as appropriate; for example, the cell stack device 1 may include only one cell stack 2. Moreover, the cell stack device 1 can also include the reformer 22.

The examples of the fuel cells 3 illustrated in FIG. 1 are hollow flat plate-shaped fuel cells each including a plurality of fuel gas flow passages that allow the fuel gas to flow through the fuel cells 3 in the longitudinal direction thereof. The fuel cells 3 are solid oxide fuel cells that each include a support body also including fuel gas flow passages as well as a fuel electrode layer, a solid electrolyte layer, and an oxygen electrode layer layered in that order on the surface of the support body. Note that oxygen-containing gas flows between the fuel cells 3.

Moreover, the reformer 22 illustrated in FIG. 3 reforms a raw fuel such as natural gas or kerosene supplied via a raw fuel supply pipe 26 to produce the fuel gas. The reformer 22 preferably has a structure that enables steam reforming, which has an efficient reformation reaction. The reformer 22 includes a vaporizing unit 23 configured to vaporize water and a reforming unit 24 including a reforming catalyst (not illustrated) for reforming the raw fuel into fuel gas. Then, the fuel gas produced in the reformer 22 is supplied to the manifold 7 via a fuel gas channeling pipe 26 (corresponding to the fuel gas supply pipe 8 illustrated in FIG. 1A). The fuel gas is then supplied via the manifold 7 to the fuel gas flow passages disposed inside the fuel cells 3.

Moreover, FIG. 3 illustrates the cell stack device 1 housed in the housing container 21, with the cell stack device 1 extracted rearward and a portion of the housing container 21 (front and back surfaces) removed. Here, in the module 20 illustrated in FIG. 3, the cell stack device 1 can be slid and housed in the housing container 21.

Note that an oxygen-containing gas introduction member 27 is disposed in the interior of the housing container 21, between the cell stacks 2 arranged side by side on the manifold 7, so that the oxygen-containing gas flows along the sides of the fuel cells 3, from a lower end portion toward an upper end portion.

As illustrated in FIG. 4, the housing container 21 of the module 20 has a two-layer structure including an inner wall 28 and an outer wall 29. The outer wall 29 forms the outer frame of the housing container 21, and the inner wall 28 forms a power generation chamber 30 that houses the cell stack device 1. Furthermore, in the housing container 21, the space between the inner wall 28 and the outer wall 29 forms an oxygen-containing gas flow path 36 through which oxygen-containing gas flows toward the fuel cells 3.

Here, the oxygen-containing gas introduction member 27 is inserted from an upper portion of the housing container 21, passing through the inner wall 28, and fixed. The oxygen-containing gas introduction member 27 includes, on an upper side, an oxygen-containing gas inflow opening (not illustrated) through which the oxygen-containing gas flows, and a flange 40; and, on a lower side, an oxygen-containing gas outflow opening 31 through which the oxygen-containing gas flows toward a lower end portion of each of the fuel cells 3. Moreover, a thermal insulating member 32 is arranged between the flange 40 and the inner wall 28.

Note that while the oxygen-containing gas introduction member 27 is disposed between the two cell stacks 2 arranged side by side in the interior of the housing container 21 in FIG. 4, the location of the oxygen-containing gas introduction member 27 may be changed as appropriate depending on the number of the cell stacks 2. For example, when the housing container 21 houses only one cell stack 2, two oxygen-containing gas introduction members 27 may be provided and disposed so as to sandwich the cell stack 2 from both side surface sides.

Inside the power generation chamber 30, the thermal insulating members 32 for maintaining the temperature inside the module 20 at a high temperature are provided as appropriate to prevent a large amount of the heat inside the module 20 from being radiated away, which would cause the temperature of the fuel cells 3 (the cell stacks 2) to decrease and thereby cause the power generation amount to decrease.

The thermal insulating members 32 are preferably arranged in the vicinity of the cell stacks 2. Particularly, the thermal insulating members 32 are preferably arranged on the side surfaces of the cell stacks 2 extending in the direction in which the fuel cells 3 are arranged and have a width no less than the width of the side surfaces of the cell stacks 2 in the direction in which the fuel cells 3 are arranged. The thermal insulating members 32 are preferably arranged on both side surface sides of the cell stacks 2. This configuration makes it possible to effectively suppress temperature decreases in the cell stacks 2. Furthermore, this makes it possible to suppress oxygen-containing gas led in by the oxygen-containing gas introduction member 27 from being discharged from the side surface sides of the cell stacks 2, thereby making it possible to promote the flow of oxygen-containing gas between the fuel cells 3 of the cell stacks 2. Note that openings 33 are formed in the thermal insulating members 32 arranged on both side surface sides of the cell stacks 2 in order to regulate the flow of oxygen-containing gas to the fuel cells 3 and to decrease the differences in temperature in the longitudinal direction in which the cell stacks 2 extend as well as in the direction in which the fuel cells 3 are stacked.

Moreover, on the inner sides of the inner walls 28 extending in the direction in which the fuel cells 3 are arranged, exhaust gas inner walls 34 are formed. The space between the inner walls 28 and the exhaust gas inner walls 34 forms exhaust gas flow paths 37 that allow the exhaust gas inside the power generation chamber 30 to flow from top to bottom. Furthermore, the exhaust gas flow paths 37 communicate with an exhaust hole 35 formed at the bottom of the housing container 21. Further, the thermal insulating members 32 are disposed on the cell stack 2 side of the exhaust gas inner walls 34 as well.

Accordingly, exhaust gases produced when the module 20 operates (during a startup process, power generation, or a shutdown process) flow through the exhaust gas flow paths 37 and then are exhausted through the exhaust hole 35. Note that the exhaust hole 35 may be formed by cutting out a portion of the bottom of the housing container 21 or by providing a pipe-shaped member.

Note that, inside the oxygen-containing gas introduction member 27, a thermocouple 39 for measuring the temperature near the cell stacks 2 is disposed such that a temperature sensing portion 38 of the thermocouple 39 is positioned at the center of the fuel cells 3 in the longitudinal direction and at the center in the direction in which the fuel cells 3 are arranged.

Additionally, in the module 20 configured as described above, the fuel gas and the oxygen-containing gas exhausted from the fuel gas flow passages of the fuel cells 3 and not used in power generation are combusted between an upper end of the fuel cells 3 and the reformers 22, making it possible to increase and maintain the temperature of the fuel cells 3. In addition, this makes it possible to heat the reformers 22 disposed above each of the fuel cells 3 (cell stacks 2), and efficiently perform a reformation reaction in the reformers 22. Note that during normal power generation, the module 20 has an inner temperature of approximately 500 to 800° C. due to the abovementioned combustion process and the power generation in the fuel cells 3.

Figure 5:
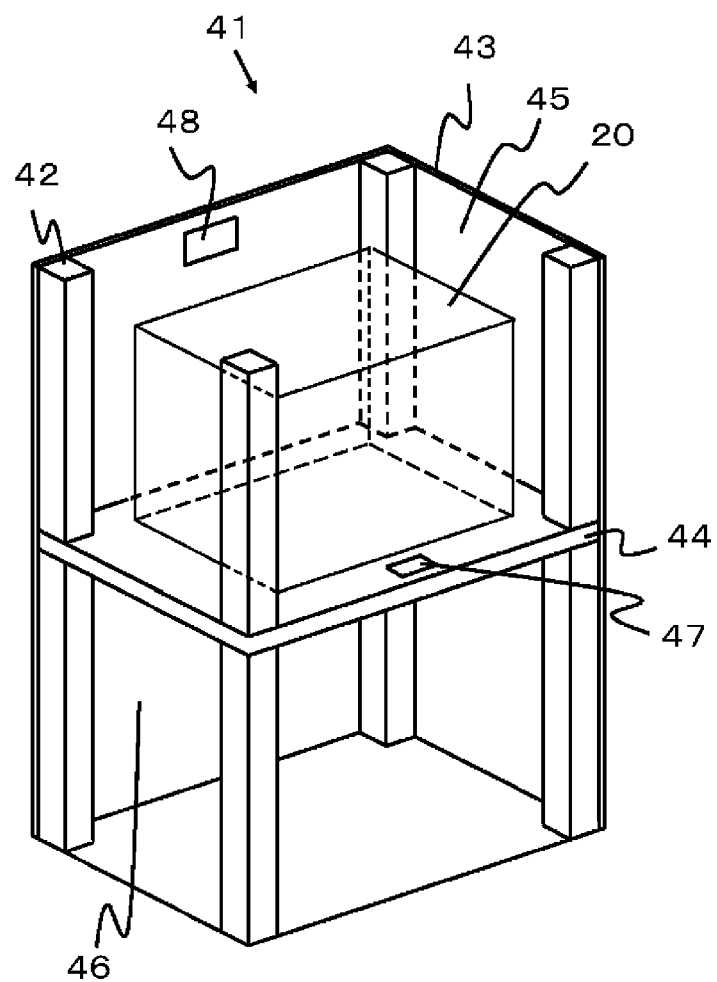
FIG. 5 is an exploded perspective view schematically illustrating an example of a module housing device according to the present embodiment.

FIG. 5 is an exploded perspective view illustrating an example of a fuel cell device according to the present embodiment in which the module 20 illustrated in FIG. 3 and an auxiliary device (not illustrated) configured to operate the module 20 are housed in an external casing. Note that some of the components of the configuration are not illustrated in FIG. 5.

In a fuel cell device 41 illustrated in FIG. 5, an external casing formed using supports 42 and exterior plates 43 is divided into an upper and a lower region using a dividing plate 44. The upper region forms a module housing chamber 45 that houses the module 20. The lower region forms an auxiliary device housing chamber 46 that houses the auxiliary device configured to operate the module 20. Note that the auxiliary device housed in the auxiliary device housing chamber 46 is not illustrated in FIG. 5.

Furthermore, an airflow hole 47 for allowing air in the auxiliary device housing chamber 46 to flow into the module housing chamber 45 is formed in the dividing plate 44, and an exhaust hole 48 for exhausting air out of the module housing chamber 45 is formed in one of the exterior plates 43 of the module housing chamber 45.

In this fuel cell device 41, the module 20 having improved long-term reliability as described above is housed in the module housing chamber 45, and the auxiliary device configured to operate the module 20 is housed in the auxiliary device housing chamber 46. This configuration makes it possible to provide a fuel cell device 41 having improved long-term reliability.

The present invention has been described in detail above. However, the present invention is not limited to the embodiments described above, and various modifications or improvements can be made without departing from the essential spirit of the present invention.

For example, the fuel cell may be a fuel cell in which the air electrode layer, the solid electrolyte layer, and the fuel electrode layer are arranged on the electrically conductive support body. Furthermore, although the above embodiments describe the fuel electrode layer 9, the solid electrolyte layer 10, and the air electrode layer 11 as being layered on the electrically conductive support body 13, the fuel electrode layer 9 itself may be set as a support body rather than using the electrically conductive support body 13, and the solid electrolyte layer 10 and the air electrode layer 11 may be disposed on the fuel electrode layer 9, for example.

The technique can also be applied in a banded bundle formed by combining a plurality of so-called banded fuel cell stacks in which a plurality of power generating element parts having the air electrode layer, the solid electrolyte layer, and the fuel electrode layer arranged on the support body are formed.

Furthermore, although the above embodiments describe the fuel cell 3, the cell stack device 1, the module 20, and the fuel cell device 41, the present embodiments can also be applied in an electrolytic cell (SOEC) that generates hydrogen and oxygen ($O_2$) by electrolyzing water vapor (water) by applying water vapor and voltage in a cell and to an electrolytic cell stack device, an electrolytic module, and an electrolytic device, which is a module housing device, provided with this electrolytic cell.

WORKING EXAMPLE 1

Effects of the present embodiment will be described next with reference to results confirmed through simulations.

Figure 6:
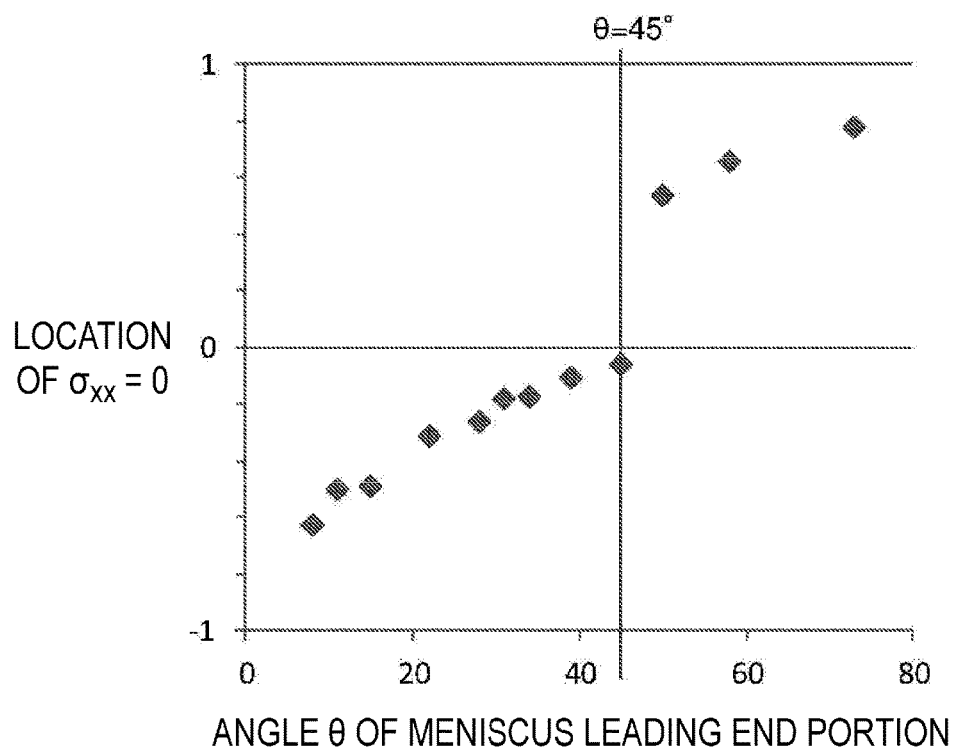
FIG. 6 is a graph showing results of a simulation according to the present embodiment.

FIG. 6 is a graph showing the results of a simulation in which a location of the bonded part between the fuel cell 3 and the sealing member 16 where the stress is 0 was investigated.

Note that a fuel cell 3 configured as illustrated in FIG. 1, including an electrically conductive support body 13 having a flat-shaped cross-section and containing Ni and $Y_2O_3$, a fuel electrode layer 9 formed from $ZrO_2$ containing Ni (NiO) and yttria in a solid solution, a solid electrolyte layer 10 formed from $ZrO_2$ containing 8 mol % of yttria in a solid solution, an air electrode layer 11 formed from LaSrCoFe, and an interconnector 12 formed from $LaCrO_3$, was used as the fuel cell 3. Glass was used as the sealing member 16.

In the graph, the vertical axis represents a location where stress between the fuel cell 3 and the sealing member 16 ($\sigma_{xx}$) is 0, and the horizontal axis represents the angle θ of the meniscus. Note that the location of the bond between the leading end portion of the meniscus and the fuel cell 3 is indicated as 0 on the vertical axis, and a point being located higher than the 0 line means that the location where the stress between the fuel cell 3 and the sealing member 16 ($\sigma_{xx}$) is 0 is located in the fuel cell 3 above the location of the bond between the leading end portion of the meniscus and the fuel cell 3, or to rephrase, means that the bonded part between the fuel cell 3 and the sealing member 16 is subjected to tensile stress.

On the other hand, the location where the stress between the fuel cell 3 and the sealing member 16 ($\sigma_{xx}$) being lower than the 0 line means that the location where the stress between the fuel cell 3 and the sealing member 16 ($\sigma_{xx}$) is on the side where the bonded part between the fuel cell 3 and the sealing member 16 is located, or to rephrase, means that the bonded part between the fuel cell 3 and the sealing member 16 is subjected to compressive stress.

Here, the bonded part between the fuel cell 3 and the sealing member 16 being subjected to compressive stress means that stresses oriented toward both the fuel cell 3 and the sealing member 16 arise, which means that the bond is strengthened.

As illustrated in FIG. 6, it can be seen that in the case where the angle θ between the vertical line drawn from the leading end portion 18 of the meniscus of the sealing member 16 toward the manifold 7 and a straight line connecting the leading end portion 18 and the point 19 located on the concave profile line of the meniscus and at a midpoint of the height of the leading end portion 18 from the bottom part 17 of the concave is 45° or less, the location where the stress between the fuel cell 3 and the sealing member 16 ($\sigma_{xx}$) is 0 will be located lower than the 0 line, and thus the bonded part between the fuel cell 3 and the sealing member 16 will be subjected to compressive stress. As a result, the formation of cracks in the bonded part between the fuel cell 3 and the sealing member 16 can be suppressed.

On the other hand, it can be seen that in the case where the stated angle θ is greater than 45°, the location where the stress between the fuel cell 3 and the sealing member 16 ($\sigma_{xx}$) is 0 will be located higher than the 0 line, and the bonded part between the fuel cell 3 and the sealing member 16 will be subjected to tensile stress. In this case, the formation of cracks in the bonded part between the fuel cell 3 and the sealing member 16 cannot be suppressed.

As such, it was confirmed that in the present embodiment, the formation of cracks can be suppressed in the bonded part between the fuel cell 3 and the sealing member 16 in the case where the point angle of the meniscus is 45° or less.

WORKING EXAMPLE 2

Figure 7:
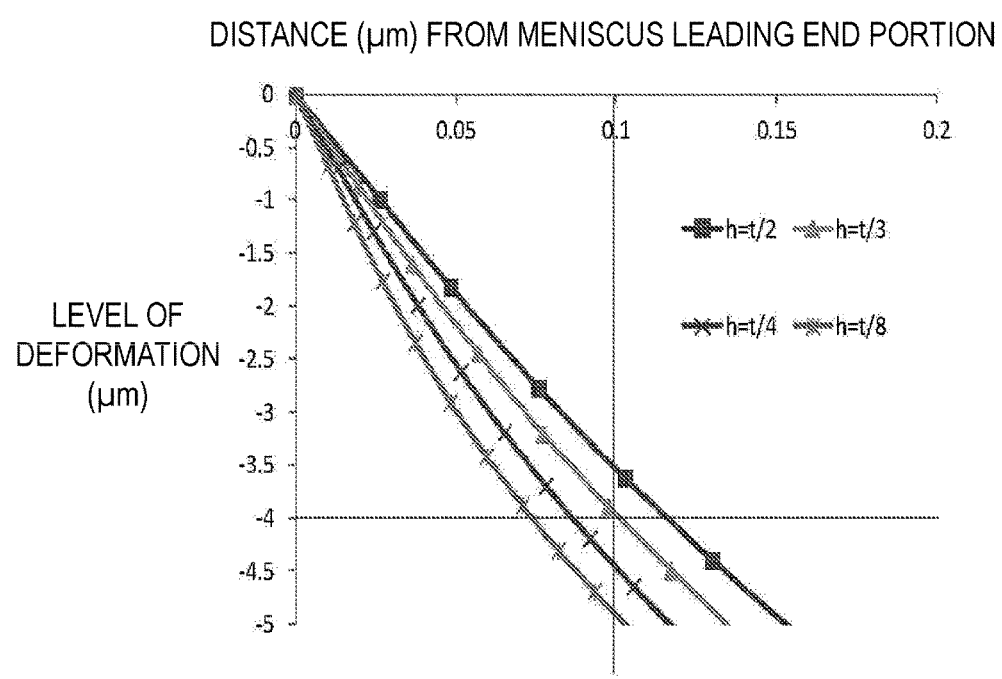
FIG. 7 is a graph showing results of another simulation according to the present embodiment.

FIG. 7 is a graph showing results of a simulation carried out regarding a relationship between the thickness of the fuel cell 3 and the height of the sealing member 16, using the above-described fuel cell 3 and sealing member 16.

In the graph, the vertical axis represents a level of deformation in the fuel cell 3. Note that the "level of deformation" refers to a level of inward deformation of the fuel cell 3. The horizontal axis, meanwhile, represents a distance from the leading end of the sealing member 16.

As illustrated in FIG. 7, when h represents a height from the bottom part 17 of the concave of each of the sealing members 16 to the leading end portion and t represents a thickness of each of the fuel cell 3, and an equation of h≥t/3 is satisfied, the level of deformation in the fuel cell 3 is 4 μm or less in the case where the distance from the leading end portion 18 of the sealing member 16 is 0.1 μm. On the other hand, it can be seen that when the equation of h≥t/3 is not satisfied, namely when h=t/4 and h=t/8, the level of deformation in the fuel cell 3 will be 4 μm or greater in the case where the distance from the leading end portion 18 of the sealing member 16 is 0.1 μm, and thus deformation in the fuel cell 3 cannot be suppressed sufficiently. Furthermore, it was confirmed from the above results that the level of deformation can be better suppressed as the height h of the sealing member 16 increases relative to the thickness of the fuel cell 3.

REFERENCE SIGNS LIST

1 Cell stack device
3 Fuel cell
7 Manifold
16 Sealing member
18 Leading end portion
20 Fuel cell module
41 Fuel cell device

The invention claimed is:
1. A cell stack device comprising:
   a cell stack comprising a plurality of cells that are arranged;
   a manifold fixed to an end of each of the cells; and
   a sealing member fixing the cells and the manifold, the sealing member comprising
   a meniscus structure having a concave shape in a cross-section taken in a direction in which the cells are arranged,
   wherein an angle θ of at least a section of the sealing member disposed between at least two neighboring cells of the cells is 45° or less, where the angle θ is defined by an angle between a vertical line drawn from a leading end portion of the meniscus structure toward the manifold and a straight line connecting the leading end portion and a point located on a profile line of a concave of the meniscus structure and at a midpoint of a height of the leading end portion from a bottom part of the concave.
2. The cell stack device according to claim 1,
   wherein the angle θ of the sealing member disposed between any two neighboring cells of the cells is 45° or less.
3. The cell stack device according to claim 2,
   wherein the angle θ of the sealing member disposed between two neighboring cells of the cells in an end section in the direction in which the cells are arranged in the cell stack is lower than the angle θ of the sealing member disposed between two neighboring cells of the cells in a center section in the direction in which the cells are arranged in the cell stack.
4. The cell stack device according to claim 1,
   wherein a relationship of h≥t/3 is satisfied, where h represents a height from the bottom part of the concave of the sealing member to the leading end portion and t represents a thickness of each of the cells.
5. The cell stack device according to claim 1,
   wherein the angle θ in an end section in a width direction of the cells is lower than the angle θ in a center section in the width direction of the cells, wherein the width direction is perpendicular to the direction in which the cells are arranged.
6. A module comprising:
   a housing; and
   the cell stack device according to claim 1 in the housing.
7. A module housing device comprising:
   an external casing;
   the module according to claim 6 in the external casing; and;

an auxiliary device configured to operate the module in the external casing.

* * * * *